United States Patent [19]
Gallo et al.

[11] Patent Number: 5,757,962
[45] Date of Patent: May 26, 1998

[54] CHARACTER RECOGNITION

[75] Inventors: Girolamo Gallo, Citta'Ducale; Cristina Lattaro, Rieta; Flavio Lucentini, Rome; Guilio Marotta, Rieti; Giuseppe Savarese, Naples, all of Italy

[73] Assignee: Texas Instruments Incorporated, Dallas, Tex.

[21] Appl. No.: 216,574

[22] Filed: Mar. 22, 1994

[30] Foreign Application Priority Data

Mar. 22, 1993 [IT] Italy ................. RM93A0179

[51] Int. Cl.$^6$ ................................. G06K 9/46
[52] U.S. Cl. ........................... 382/204; 382/187
[58] Field of Search ..................... 382/13, 22, 34, 382/182, 184, 204, 187, 220, 222

[56] References Cited

U.S. PATENT DOCUMENTS

| | | | |
|---|---|---|---|
| 4,542,526 | 9/1985 | Satoh et al. | 382/187 |
| 4,543,660 | 9/1985 | Maeda | 382/34 |
| 4,773,098 | 9/1988 | Scott | 382/22 |
| 4,977,603 | 12/1990 | Irie et al. | 382/34 |
| 5,008,948 | 4/1991 | Tsukawaki | 382/13 |
| 5,058,182 | 10/1991 | Kuan et al. | 382/13 |
| 5,105,468 | 4/1992 | Guyon et al. | 382/14 |

FOREIGN PATENT DOCUMENTS 38 22 671   11/1990   Germany .

OTHER PUBLICATIONS

Intternational Journal of Mini and Microcomputers, vol. 15, No. 1, 1993, 'Automatic Recognition of Handwritten Arabic Characters' Anaheim, California. US, pp. 23–30, XP372526, El–Gwad, et al.

Pattern Recognition, vol. 8, No. 2, Apr. 1976, 'Approaches to Chinese Character Recognition' Elmsford, NY, pp. 87–98, W. Stallings.

Proceedings of the IEEE, vol. 68, No. 4, Apr. 1980, 'Automatic Recognition of Handprinted Characters —the State of the Art' New York US, pp. 469–487, C.Y. Suen.

*Primary Examiner*—Leo Boudreau
*Assistant Examiner*—Chris Kelley
*Attorney, Agent, or Firm*—Gerald E. Laws; William B. Kempler; Richard L. Donaldson

[57] ABSTRACT

A method and apparatus for recognizing a script written character wherein the character is entered using character entering means and digitised by appropriate means. The digitised character is then stored in, for example, a memory. Codes representing topological and vector features of the character are extracted from the character, then the topological and vector features of the character are compared with topological and vector features of a plurality of reference characters defining a set of reference characters stored in a memory. Each of the reference characters included in the set corresponds to a specific script written character. A logic process is then performed to determine which reference character of the set of reference characters has topological and vector features most closely corresponding to the topological and vector features of the digitized character thereby identifying the script written character. In extracting the topological and vector features of the character to be recognized, the relative weighting of the topological features and the vector features can be varied for different types of script to enable still more accurate recognition.

13 Claims, 11 Drawing Sheets

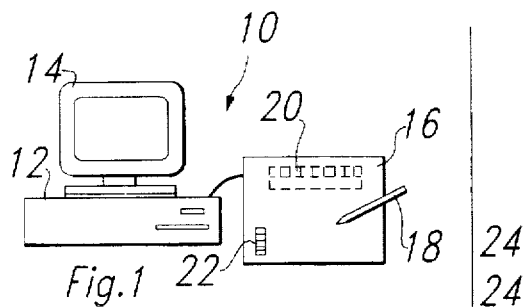
Fig.1
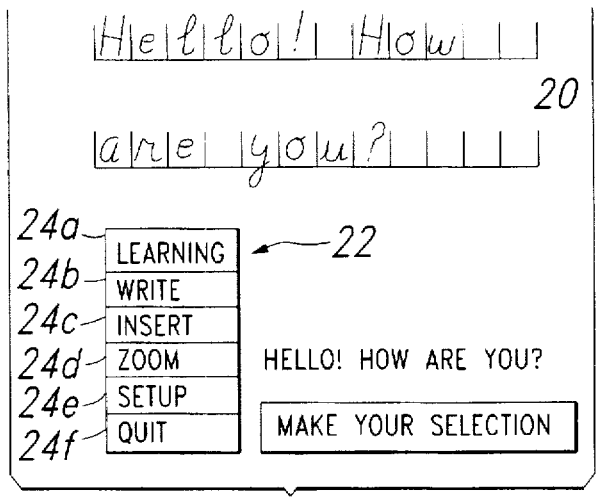
Fig.2
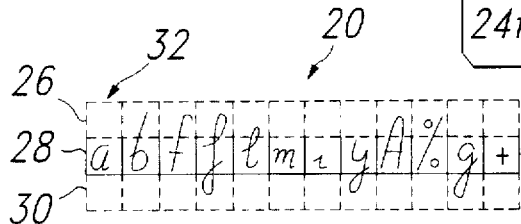
Fig.3
```
CHAR A
  STROKES 2
   POSITION 1 BOX (179 39)  (212 89)
   STROKE 1 POINTS 44
    189 71     189 72
    189 71     189 70
    189 69     189 67
    189 65     189 64
    189 62     189 61
    190 59     190 58
    191 56     191 55
    192 54     192 53
    193 52     193 51
    194 50     195 49
    196 48     197 48
    197 47     198 47
    199 48     199 49
    199 50     200 52
    200 53     200 54
    200 55     201 57
    201 58     201 59
    201 60     201 62
    201 63     201 64
    201 65     201 67
    201 68     201 69
    201 70     201 71
   STROKE 2 POINTS 10
    192 64     191 63
    192 63     193 63
    194 63     195 63
    196 63     198 62
    199 62     200 62
```
Fig.4
```
CHAR A STROKES 2 FRAME 3
........######..
.......###....#..
......##......##.
.....##........#.
....##.........#.
...##..........#.
..#............##
.##.............#
.#..............#
#...............#
#.........######
#....######.....#
#...............#
#...............#
#...............#
#...............#
#...............#
#...............#
```
Fig.5

```
........######..  1
.......###.....#..  2
......##.......##.  2
.....##.........#.  2
....##...........#.  2
...#..............##  2
..##...............#  2
.#..................#  2
#....................#  2  X-INTERSECTIONS
#............######  2
#....######.....#  3
#................#  2
#................#  2
#................#  2
#................#  2
#................#  2
1111222222222221
       Y-INTERSECTIONS
INTERSECTION CODE (Y-CODE + Y-CODE): 122222222232222211122222222221
```

*Fig.8*

CHARACTER RECOGNITION

This invention relates to a method and apparatus for character recognition, particularly the recognition of letters, numerals and other symbols such as Japanese characters, musical symbols, simple drawings and the like.

In keyboardless input schemes for computer systems, for example, instructions or data can be input by the user of the system by means of a pen-like stylus on an input/output screen. An example of such a screen is a touch sensitive monitor. The input instructions or data can be handwritten script, numbers, or any other form of handwritten character. In these types of systems it is essential for the computer to "understand" the input it has been given by the user and to recognize and read the input characters.

There are a number of known systems capable of recognizing and reading input characters. One such system is disclosed in U.S. Pat. No. 4,972,496. This patent discloses a system including a transparent input screen that generates positional information corresponding to the positions at which a stylus contacts the screen (i.e. the positional information of the character) and also displays to the user the input that has been entered. The system further includes a computer which is programmed to compile the positional information into "Strokes" made by the stylus. The strokes are analyzed to identify the starting point of each stroke, the end of each stroke, the slope of the stroke, the stroke centriod, the rate of change of the slope, and where a character comprises more than one stroke whether it was the first, second, etc. Once the stroke alone has been analyzed a personalized data base which is unique to a specific user is accessed to identify the character which most closely corresponds to the character under analysis.

This system is relatively complex to implement using dedicated hardware for stroke analysis due to the detailed stroke analysis which must be conducted. In addition it relies on a personalized data base for each user. This can mean that a large amount of memory is wasted if a given system is used by many users. If no personalized data base is set up the degree of recognition of the system can fall to an unacceptable level. Since this system relies only on stroke analysis it is important for all users to write the characters in a predetermined conventional manner. Recognition is severely inhibited when the user adopts a writing style where the strokes are different from the predetermined conventional manner. Even though the free style characters may look very similar to the conventional characters, recognition may not be accurate since the stroke analysis indicates a different character than that which has been written.

One object of the present invention is to provide a character recognition system which overcomes at least some of the disadvantages of known systems.

Another object of the present invention is to provide a simple character recognition system which has an improved recognition rate even when no personalized data base is utilized.

According to one aspect of the present invention there is provided a method for recognising a script written character comprising the steps of entering the character using character enter means; digitizing the character; storing the digitized character; extracting topological features and vector features of said character; comparing the topological and vector features of the character with a set of reference topological and vector features stored in a memory, each of the set corresponding with a specific character, and performing a logic process to determine which of the set of reference features most closely corresponds to the topological and vector features of the digitized character, thereby recognising the script written character.

The system of the invention has the advantages that there is no need for time consuming complex analysis of the character and that a data base will provide recognition of about upwards of 98% of all characters input by a user.

Reference will now be made, by way of example, to the accompanying drawings, in which:

FIG. 1 is a block diagram of a character recognition system according to one aspect of the present invention;

FIG. 2 is a diagram of an example of a program memory displayed on the screen of the system;

FIG. 3 is a diagram showing some examples of characters with frame constraint defaults;

FIG. 4 is a diagram of an STK format of the character A;

FIG. 5 is a diagram of a pattern format of the character A;

Figure 6A:
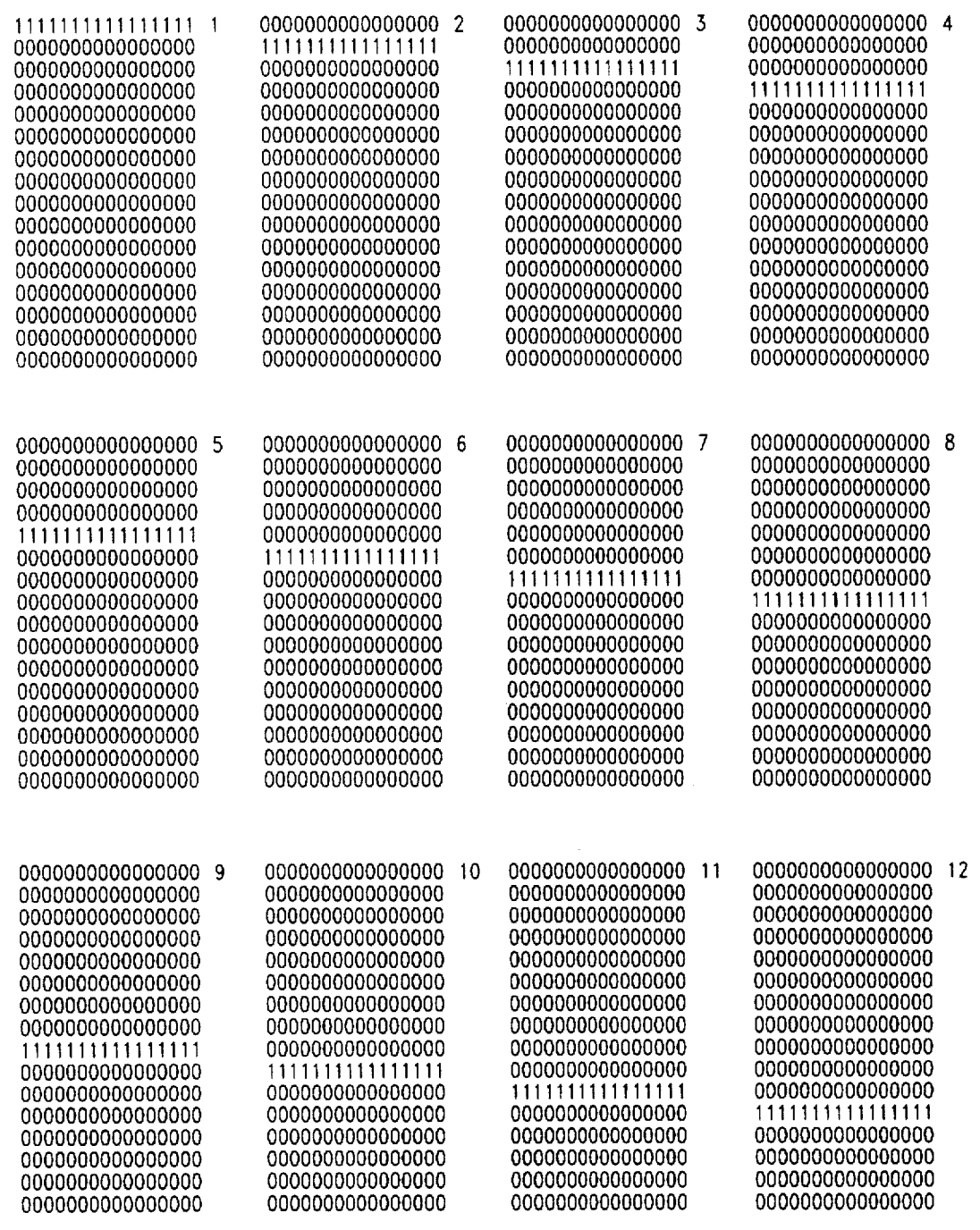
Figure 6B:
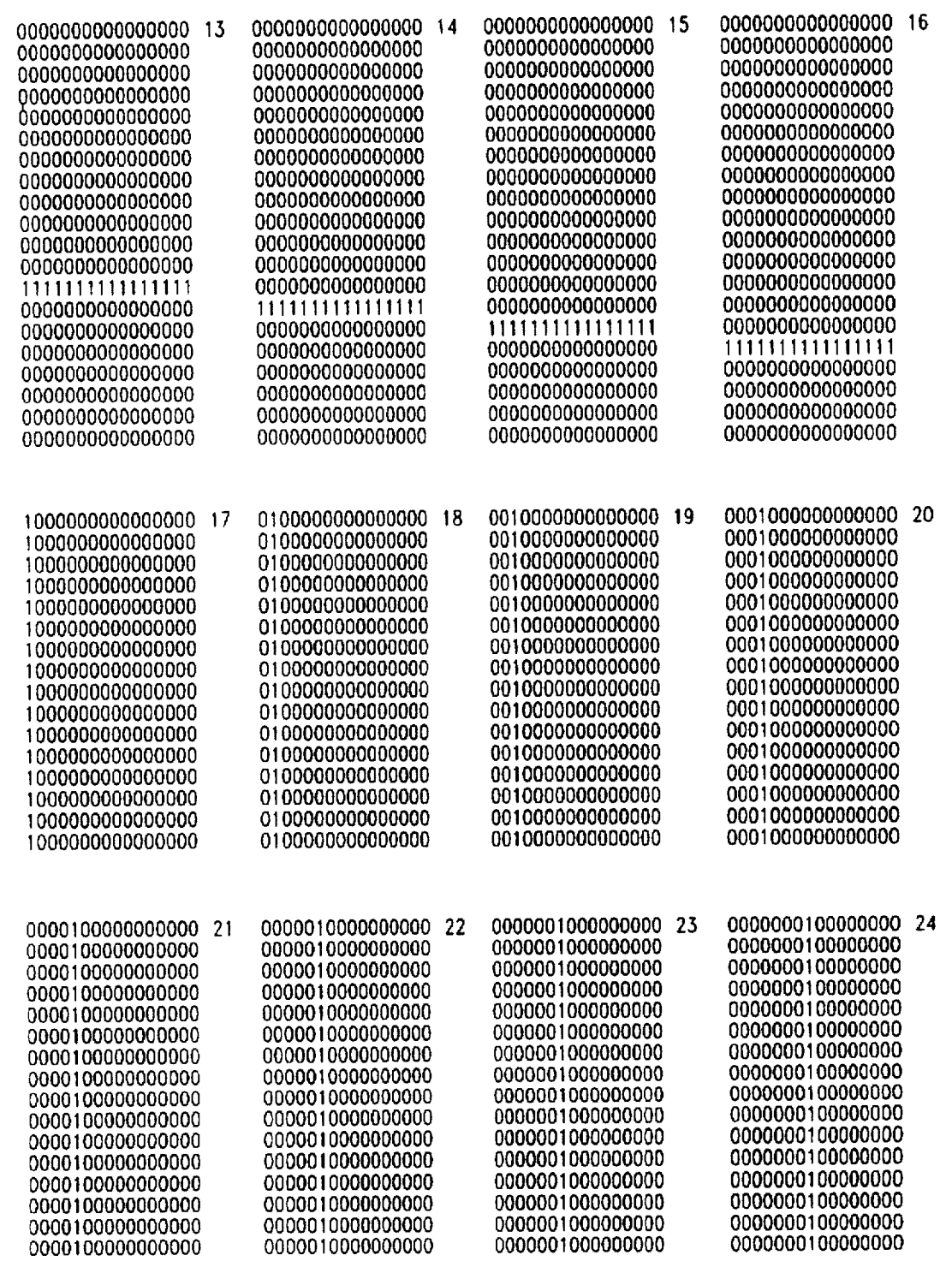
Figure 6C:
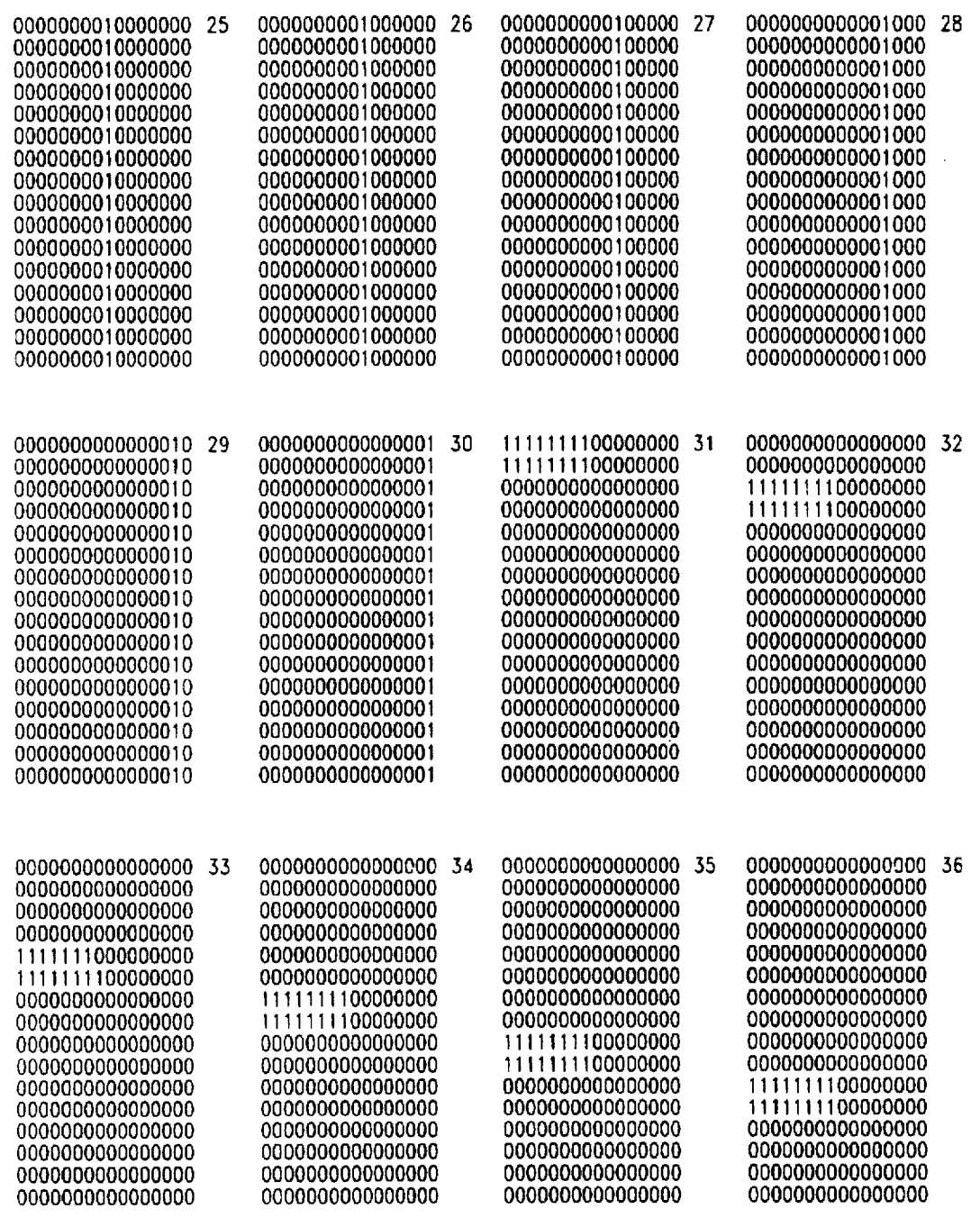
Figure 6D:
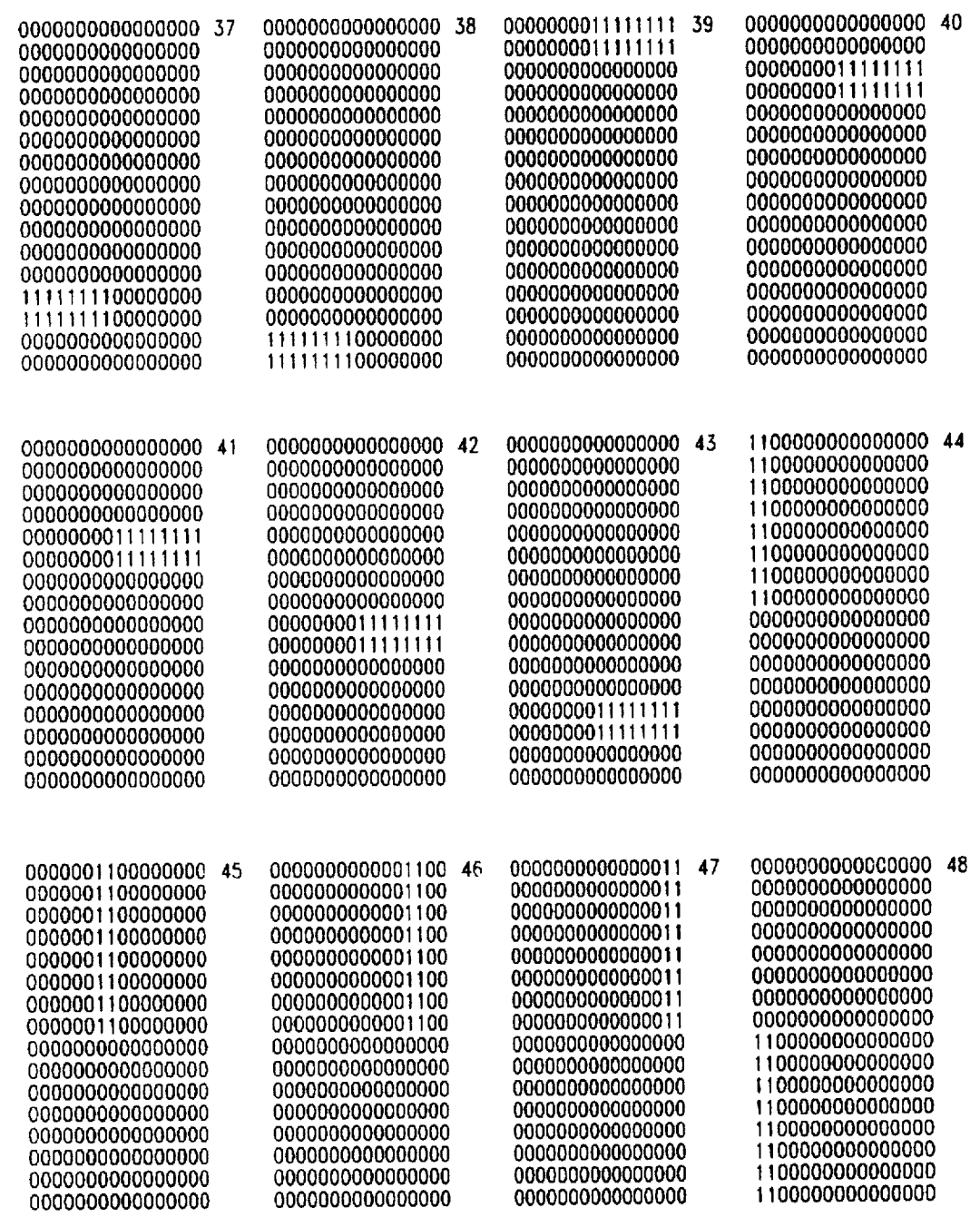
Figure 6E:
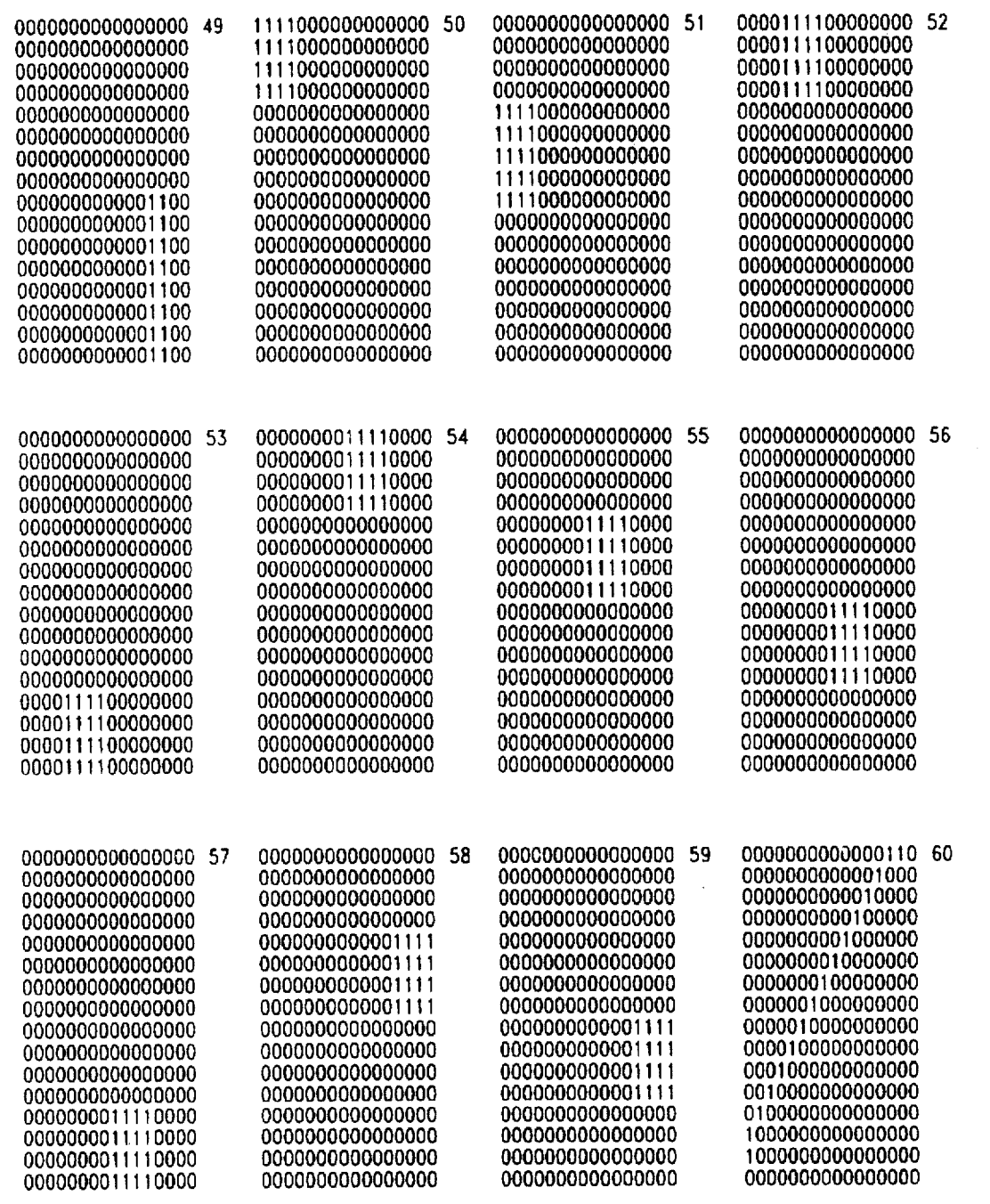
Figure 6F:
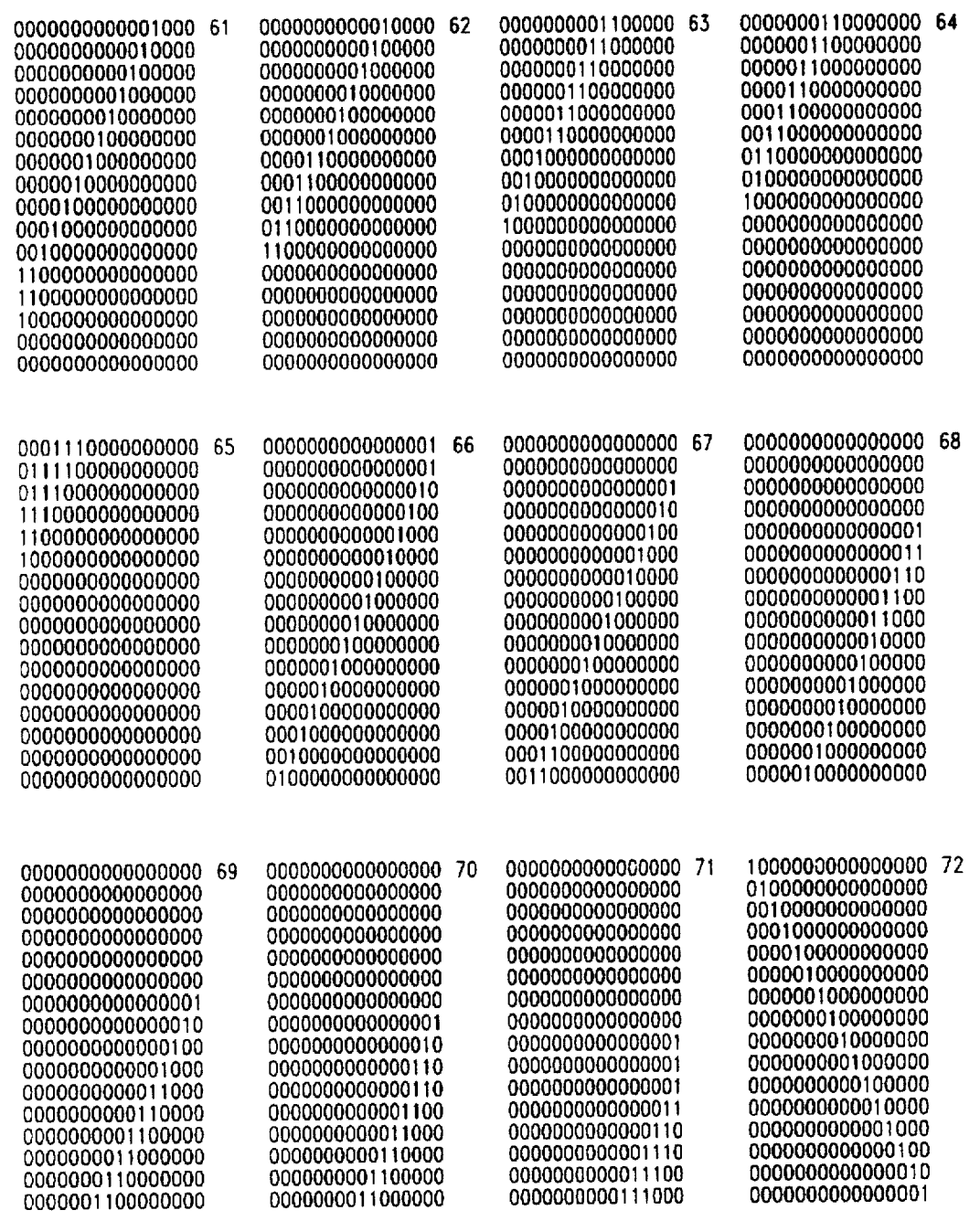
Figure 6G:
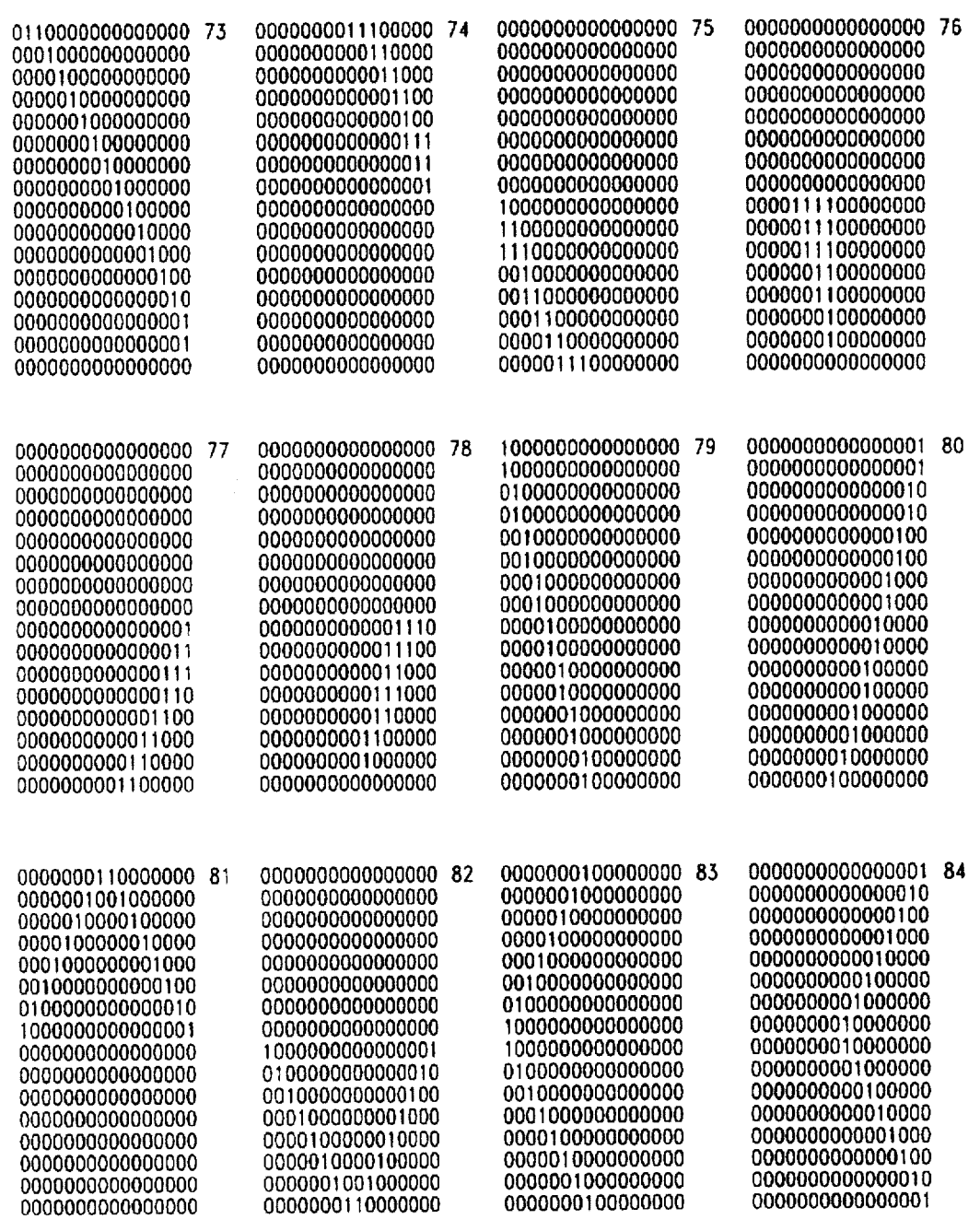
Figure 6H:
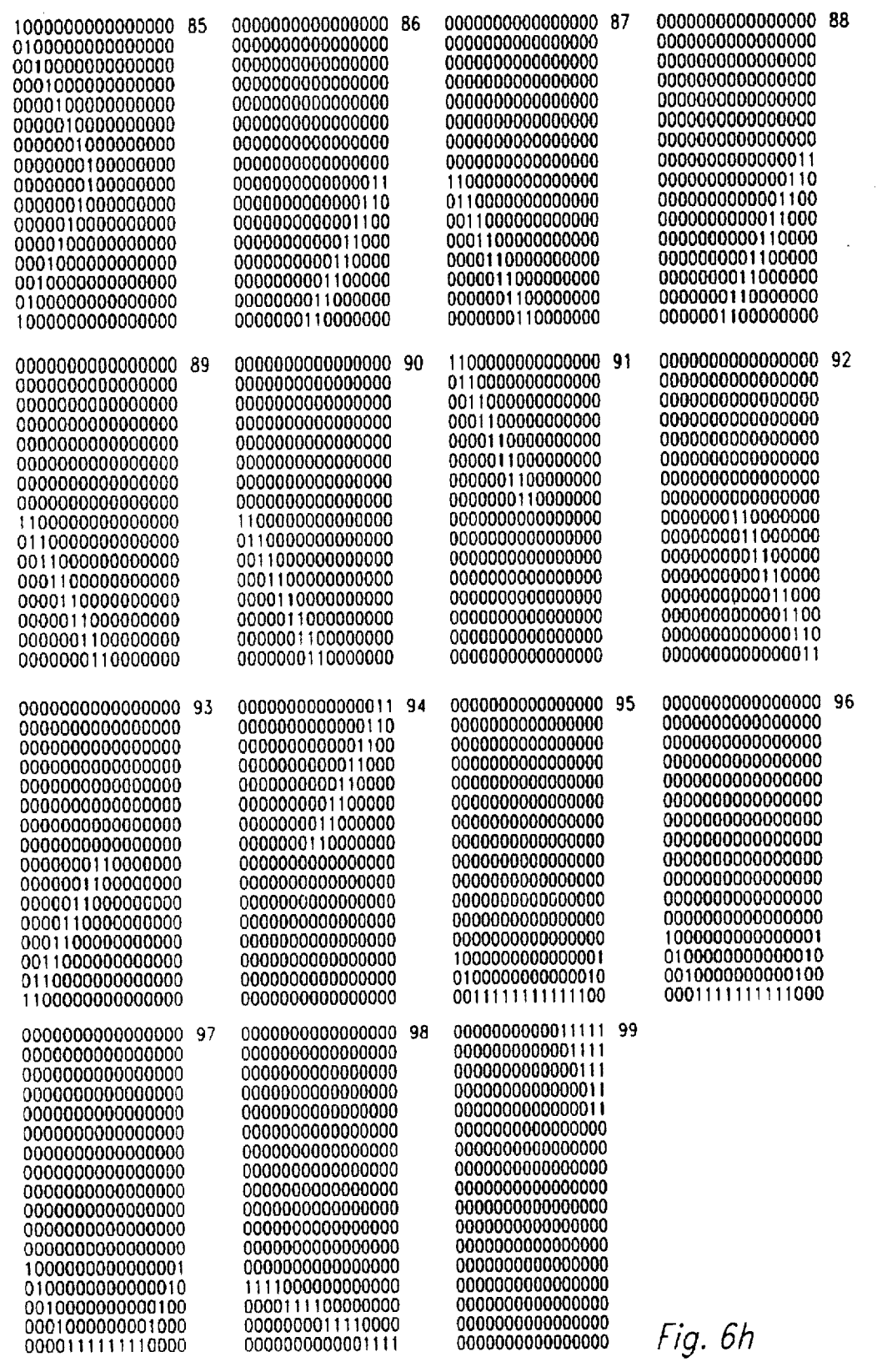

FIG. 6 is a diagram showing a topological feature set used to identify any character; and FIGS. 7 and 8 are diagrams for showing how the character is recognized.

Referring to FIG. 1 a character recognition system is shown generally at 10. The system comprises a microcomputer 12 having a monitor 14. The computer is connected to a touch sensitive screen, for example an LCD graphic digitizer 16. It is possible to replace the monitor with a touch sensitive monitor and dispense with the separate touch sensitive screen. A pen-like stylus 18 may be used on the touch sensitive screen to input instructions, data or the like to the computer. A user can write commands directly onto the screen. For the most accurate recognition of the commands the characters should preferably be entered in a frame shown generally at 20. The touch sensitive screen menu used by the user to enter information is shown in FIG. 2. The main options available are shown in blocks 22 and may be activated by touching the stylus on the appropriate box 24a-f.

The frame 20 is shown in greater detail in FIG. 3. It comprises a top frame 26, a middle frame 28 and a bottom frame 30. Each character should be entered into one column 32. The position of the character is used to aid in the recognition of that character. For example "short" lower case letters such as a, c, e, m, n, o, r, s, u, v, w, x and z should be entered in the middle frame and should preferably be of such a size that they do not extend into the other frames. Taller lower case letters such as b, d, f, h, i, k, l, and t should have a larger vertical size than the smaller lower case letters and should be entered in the top and middle frames. Lower case letters with "tail" such as g, j, p, q and y should preferably be entered such that the tails extend into the bottom frame. Upper case letters and numbers should generally be entered in the top and middle frames of any given column 32. Other characters such as punctuation for example should be entered in their normal positions relative to the alphanumeric characters. The recognition of punctuation is not discussed in this document but is set out in our co-pending application Ser. No. 07/995,397 filed Dec. 18, 1992.

Adhering to the frame constraints illustrated above allows the system to recognize the difference between "c" and "C" for example. It is possible for the operator to set the size of the frames or to use the standard frame. In addition for those alphabets such as Japanese characters which do not have symbols of the same shape but different sizes; Same constraints are not necessary and the user can enter the characters in a box without any frame constraints. The same holds if the system is used for geometrical symbols or drawing recognition. The full detail of how the frame constraints aid recognition will be described in more detail below.

Once the handwritten data has been entered on the LCD graphic digitizer 16 the output of the digitizer is downloaded to the computer into what is called a stroke format file (STK file). In such a format the character is described by a sequence of strokes each of which is made up of a series of coordinates between a pen-down and pen-up condition. FIG. 4 shows an ASCII format translation of the content of a stroke file in binary form of the letter A. The output from the digitizer is then "pre-processed" before character recognition is implemented. This pre-processing comprises character scaling, centering, digital noise filtering and fitting the digital information into a pixel matrix of a given size, for example, a 16×16 matrix.

After pre-processing the character undergoes a recognition process which comprises three basic steps:

extraction of the topological characteristics (features) of the input handwritten character;

character vector code determination; and recognition by 'fuzzy' comparison with a set of reference characters stored in a memory.

The handwriting recognition is performed on each individual character once it has been written. This allows for total freedom in writing the characters according to the user's style, i.e. it is not necessary to enter the character as a particular sequence of strokes. This can allow for variations in the direction of movement of the pen and corrections can be effected after the characters have been originally written. The recognition is mainly based on symbol's optical characteristics. To solve ambiguities due to the optical aspect of the characters such as "S" and "5" a vector code is determined for each character. This vector code determination will be described in more detail below. As previously stated, the recognition of uppercase and lowercase letters with the same shape (e.g. 'c' and 'C') is improved by the user writing in fields or frames.

This particular system is optimized for characters as well as all other signs usually found in a standard computer keyboard. However, the system has been optimised for all alphabets, Japanese characters, geometrical symbols and simple drawings. In addition the principle is valid for all other alphabets. The system can be used in a writer dependent mode, in which it shows better recognition rate. However, very good recognition is possible when used as a writer-independent system, i.e. without the system training. The user can enter his own reference character set through a user friendly character mode. Once adequately trained, the system can accept any handwriting style. For example, one user may train the system to recognize multiple character styles for a given alphabet letter, or his special way of writing a given character. Alternatively, the system can be used in "untrained mode" with a standard set of characters.

The pre-processing initially converts the STK format described above to a pattern (PTN) format of a normalized 16×16 matrix. This PTN format is shown in FIG. 5. The remainder of the character pre-processing is carried out as follows:

Point Interpolation/Smoothing occurs as the digitiser converts points at a constant rate, the distance between two consecutive points being proportional to the pen speed. If the writing speed is low, some points can be very close to each other resulting in a digitising noise. Alternatively, if the writing speed is relatively fast, points can be well spaced from each other, leaving holes in the stroke. To overcome this drawback, an interpolation/smoothing routine is used to add interpolated points whenever points are too far apart and to remove points which are too close together;

Character boundaries are evaluated and the points are scaled to fit into a normalized 16×16 matrix. X and Y components are scaled with different scaling factors to completely fill the matrix. If the ratio of either X-size/Y-size or Y-size/X-size is larger than a given threshold value (typically 4) only the larger component (X or Y) of the character is scaled. This is to avoid improper expansion of 'slim' characters such as "I" or "-"; and Character mapping which involves the number of points belonging to each of 16×16 pixels being counted and their average value computed. A threshold value (about ⅛ of the average value) is used to establish if a given pixel of the matrix is to be black (1) or white (0). If the number of points in a given pixel is greater than the threshold, the corresponding bit is set to 1, otherwise it is set to 0. Additional data are added to the character matrix to specify the character identifier (only available if the character is a member of the reference set), these data include the number of strokes of the character and the frame position. This information will be used during the recognition process, as will be described below. The frame position is coded by assigning a score to each of the three writing frames: 1 for the top frame 26, 2 for the central one 28, and 4 for the bottom one 30. For instance, character 'g' is normally written in the central and bottom frames, so its frame number will be 2+4=6. Frame numbers are evaluated by checking the character position on the writing field. In order to disregard small framing errors by the user, the active area of the top and bottom fields is actually slightly smaller than indicated by the frame lines. This means that the actual boundary between the central and top frame is slightly higher than shown and the boundary between the central and bottom frame is slightly lower than shown. The amount of these shifts may be adjusted by the user.

The result of the character pre-processing stage is a 16×16 matrix in pattern format, each element of the matrix being a pixel of the character image. Allowed values for the given element are 0 (white pixel) and 1 (black pixel) as is shown in FIG. 5. At the top of the matrix is a header data line containing the following information:

a) Character identifier (available only if the character is a member of the reference set);

b) Number of strokes; and c) Frame positioning.

The header data line may also contain character vector codes.

The first step of the recognition process consists in extracting from the original 16×16 matrix and from the STK character format a topological and dynamic (vector) description or code of the characters. Recognition is then performed by comparing input character code with the codes of the reference characters collected by the user during the learning phase or from the standard set in the memory. The code basically contains four types of information:

i) Feature extraction code;

ii) Intersection code;

iii) Frame position, stroke number and character identifier (the latter only being available if the character is a member of the reference set); and iv) Character vector code.

Feature extraction is the key step of the recognition algorithm. It performs a faithful description of the character's topology to make recognition very accurate. This operation is performed by using a 'topological feature set'.

It consists of the 99 16×16 matrices shown in FIG. 6 representing elementary geometrical structures. These matrices have been obtained through a complex work of optimization performed using several character sets from many different people.

The feature extraction process basically consists of overlapping the character to the i-th (i=1, . . . , 99) feature matrix and then counting the number of black pixels they have in common. This operation can be easily implemented by means of a bitwise AND function. The counting result X is then compared with three threshold values. T1, T2, T3;

if X<=T1 the response fi of the i-th feature is set to 0 if T1<X<=T2 the response fi of the i-th feature is set to 1 if T2<X<=T3 the response fi of the i-th feature is set to 2 if X>=T3 the response fi of the i-th feature is set to 3

Figure 7:
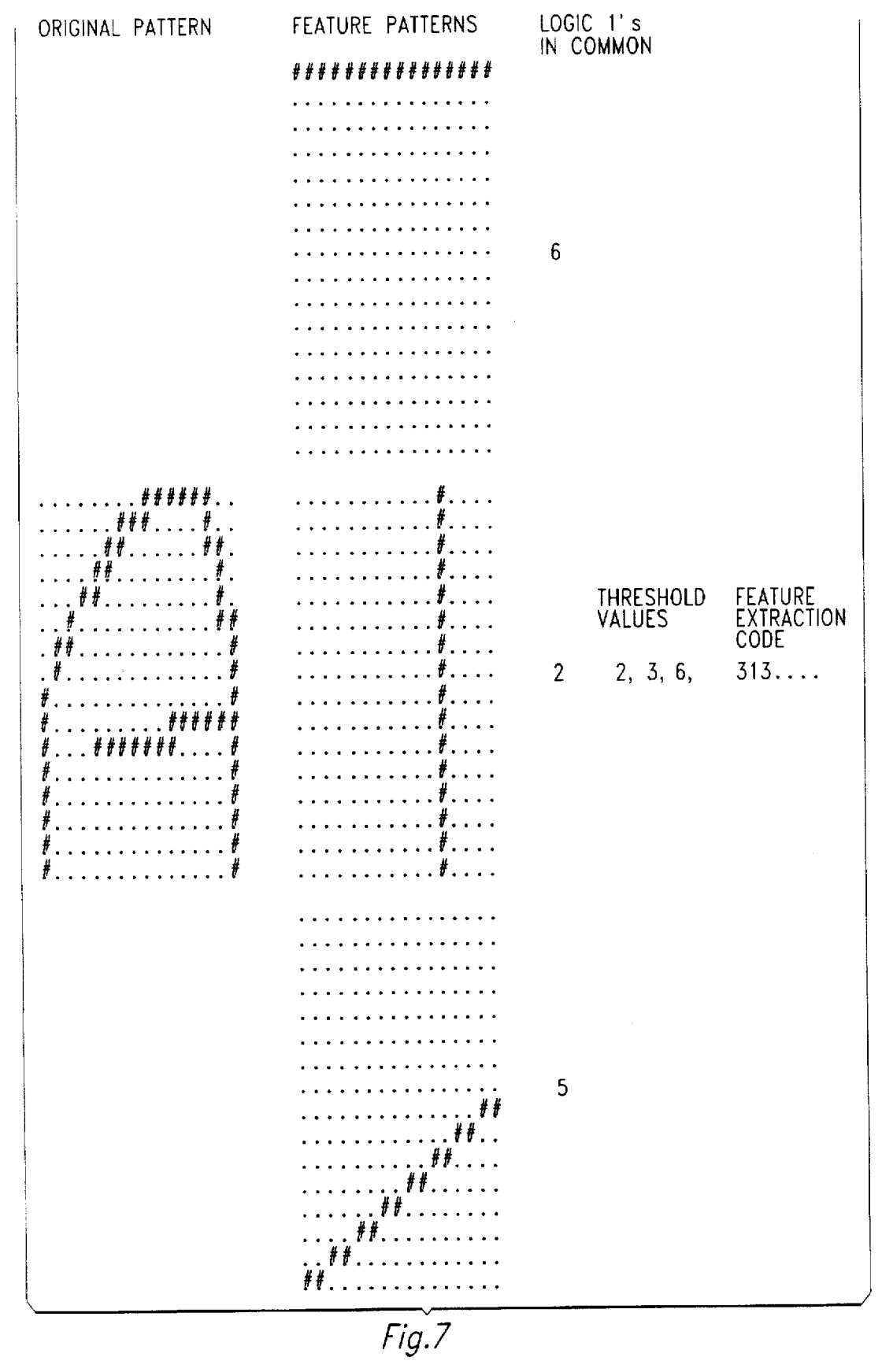

This process is shown in FIG. 7. Therefore, the result of the described operation is an array of 99 integer values called feature extraction code representing the response of the feature set to the given character. T1, T2, T3 are chosen from simulations of the system and are typically set to be T1=2, T2=3, T3=6.

The intersection code contains additional information on the character topology. It consists of 32 integer values Ni (i=1, . . . 32), each of the them being the number of intersections of the character with the 16 horizontal and the 16 vertical lines of the matrix. An example of this operation is shown in FIG. 8.

The next field of the character code contains the frame position, the number of strokes of the character and, if the character is a member of the learning sets, its identifier, provided by the user.

The last field is the character vector code information. This includes the following vector parameters:

i) Nd, where Nd+1 is the number of points in the STK character format;

ii) DIN, an array of Nd 4-bit values describing the position of each point in the STK character format respect to the previous one;

iii) APPX, which is an array of Nd 3-bit values describing the position of the X-coordinate of each point of the STK character format with respect to the X-coordinate of the first, central and last points of the STK character format;

iv) APPY, which is an array of Nd 3-bit values describing the position of the Y-coordinate of each point of the STK character format with respect to the Y-coordinate of the first, central and last points of the STK character format; and v) REL, which is an array of 12 2-bit values representing the relative position of the character extremal (max and min) points.

The DIN parameter which describes the position of each point in the STK format respect to the previous one is determined in the following manner.

Assume that (X1,Y1) are the co-ordinates of a given point in the STK format and that (X2,Y2) the co-ordinates of the subsequent one and so on. The pen-up and pendown co-ordinates in the STK point sequence are disregarded, therefore the following method can be applied even if the two points belong to different strokes. The relative positions of the two points are represented by using the following flow:

```
if (X1 > X2)
    {if (Y1 > Y2) DIN=1
     if (Y1 = Y2) DIN=2
     if (Y1 < Y2) DIN=3}
else if (X1 = X2)
```

-continued

```
    {if (Y1 > Y2) DIN=4
     if (Y1 = Y2) DIN=5
     if (Y1 < Y2) DIN=6}
else if (X1 < X2)
    {if (Y1 > Y2) DIN=7
     if (Y1 = Y2) DIN=9
     if (Y1 < Y2) DIN=10}
```

The number of DIN values for each character is Nd (number of points−1). Since the DIN values range between 1 and 10, a 4-bit value is needed to represent each of them.

For instance, if a character is made up of the following 5 points:

1:(3,6)

2:(3,8)

3:(4,7)

4:(3,7)

5:(3,8)

we obtain:

Nd=(N.points−1)=4;

DIN[0]=6;

DIN[1]=7;

DIN[2]=2; and

DIN[3]=6.

The APPX and APPY parameters represent the position of each point in the STK character format respect to the first, central and last points. As previously indicated, pen-up and pen-down co-ordinates are not considered. Assuming:

(X,Y) are the co-ordinates of the current point;

(Xo,Yo) are the co-ordinates of the first point;

(Xc,Yc) are the co-ordinates of the central point; and (Xn,Yn) are the co-ordinates of the last point.

then APPX and APPY values are obtained as follows:

if(Xc>X & Xn>X & Xo>X) APPX=0;

if(Xc>X & Xn>X & Xo≦X) APPX=1;

if(Xc>X & Xn≦X & Xo>X) APPX=2;

if(Xc>X & Xn≦X & Xo≦X) APPX=3;

if(Xc≦X & Xn>X & Xo>X) APPX=4;

if(Xc≦X & Xn>X & Xo≦X) APPX=5;

if(Xc≦X & Xn≦X & Xo>X) APPX=6; and if(Xc≦X & Xn≦X & Xo≦X) APPX=7 whilst if(Yc>Y & Yn>Y & Yo>Y) APPY=0;

if(Yc>Y & Yn>Y & Yo≦Y) APPY=1;

if(Yc>Y & Yn≦Y & Yo>Y) APPY=2;

if(Yc>Y & Yn≦Y & Yo≦Y) APPY=3;

if(Yc≦Y & Yn>Y & Yo>Y) APPY=4;

if(Yc≦Y & Yn>Y & Yo≦Y) APPY=5;

if(Yc≦Y & Yn≦Y & Yo>Y) APPY=6; and if(Yc≦Y & Yn≦Y & Yo≦Y) APPY=7

The number of APPX and APPY values for each character is Nd, as for DIN parameters. Since the possible values range between 1 and 8 and a 3-bit value is needed to store the APPX/APPY code 2*3*Nd b its are required. For instance, the APP code for the character in the previous example is:

| APPX[0] = 3 | APPX[1] = 7 | APPX[2] = 3 | APPX[3] = 3 |
|---|---|---|---|
| APPY[0] = 7 | APPY[1] = 5 | APPY[2] = 3 | APPY[3] = 6 |

-continued where
(Xo,Yo) = (3,6)
(Xc,Yc) = (4,7)
(Xn,Yn) = (3,8)

The REL parameters which represent the relative position of the characters' extremal points are evaluated as follows:
Assume that:

Xmax is the maximum value of the X co-ordinate in the STK character format;

Ymax is the maximum value of the Y co-ordinate in the STK character format;

Xmin is the minimum value of the X co-ordinate in the STK character format; and

Ymin is the minimum value of the Y co-ordinate in the STK character format;

and

Y(Xmax) is the y-co-ordinate of the point which Xmax belongs to;

X(Ymax) is the x-co-ordinate of the point which Ymax belongs to;

Y(Xmin) is the y-co-ordinate of the point which Xmin belongs to; and

X(Ymin) is the x-co-ordinate of the point which Ymin belongs to.

The 4 extremal points are considered in order of at the time at which they were written by the user and their co-ordinate values are compared. The result of the comparison is set to '+' if the difference is positive, to '-' if it is negative, to '=' if it is 0.

For instance, if our example is considered, we get:

| Xmax=4 | Ymax=8 | Xmin=3 | Ymin=6 |
|---|---|---|---| and the time ordered sequence is:
1. (Xmin, Y(Xmin))=(3,6)
2. (X(Ymin), Ymin)=(3,6)
3. (X(Ymax), Ymax)=(3,8)
4. (Xmax, Y(Xmax))=(4,7)

Comparing the 1st point with the 2nd we obtain:==
Comparing the 1st point with the 3rd we obtain:=−
Comparing the 1st point with the 4th we obtain:−−
Comparing the 2nd point with the 3rd we obtain:=−
Comparing the 2nd point with the 4th we obtain:−−
Comparing the 3rd point with the 4th we obtain:−−

Therefore the REL code associated with the particular character is:

'== =− −− =− −− −−'

Since each symbol in the REL code can take 3 different values 2-bits are required to store each of them. So, the REL code of each character requires 2*12=24 bits.

The DIN, APPX/APPY and REL codes, as well as the Nd values are added to the geometrical (or topological) character code described above. Therefore, the updated character code contains the following information:

1. Feature extraction code.
2. Intersection code.
3. Frame position, stroke number and character identifier (the latter only being available if the character is a member of the reference set).
4. Nd number.
5. DIN code.
6. APPX/APPY code.
7. REL code.

Therefore, after the coding process a given character is represented by an array of integers: 99 from feature extraction, 32 from intersections, 1 for stroke number; 1 for frame position; 1 for Nd; Nd for DIN; 2Nd for APPX/APPY and 12 for REL.

Recognition is performed by comparing value-by-value the code of the unknown input character with the coded characters in the reference set having the same frame number. Characters with frame numbers different from that of the input character are disregarded during the comparison. This has two important advantages. First, it allows recognition of characters with the same shape and different size. Secondly, the recognition process is relatively faster because it involves a lower number of comparisons. As a result, the score Sj is given by:

$$Sj = Wo*Soj - Sdj$$

and is assigned to the comparison between the unknown input character and the j-th character in the character database in the equation. In the equation Wo is a weighting factor which describes the relative importance of the optical and vector information; Soj is the so called optical or topographical score; and Sdj is the so called dynamic score.

The "optical" score Soj assigned to the j-th comparisons (j=1, . . . , Near) is given by:

$$Soj = SW*|S - Stj| + \sum_{i=1}^{99} |fi - fij| + IW* \sum_{i=1}^{32} |Ni - Nij|$$

where:
S=stroke number of the input character
Stj=stroke number of the j-th reference character
fi=response of the i-th feature to the input character
fij=response of the i-th feature to the j-th reference character
Ni=number of intersections of the i-th line with the input character
Nij=number of intersections of the i-th line with the j-th reference character
SW=stroke weight
IW=intersection weight This score is evaluated for each of the Near reference characters.

Sdj, the dynamical term of the character score can be expressed as the sum of three different terms:

$$Sdj = Aj + Wr*Rj + Wp*|Nd - Ndj|$$

where Aj is the APP/DIN score;
Rj is the REL score; and
Wp and Wr are weighting factors.

Simulation results show that best values for weighting factors Wr and Wp are 8 and 4 respectively.

The Aj score is evaluated by a comparison of the DIN and APPX/APPY codes. Let DIN, APPX, APPY and Nd the parameters refer to the input character and DINj, APPXj, APPYj and Ndj refer to the j-th character in the reference set.

DIN, APPX, APPY are made up of Nd elements, DINj, APPXj, APPYj and Ndj contain Ndj elements. Since, in general, Nd≠Ndj and there is a high variability in handwriting, it is not sufficient to compare the DIN and APPX/APPY values as they are, but multiple comparisons are required, each of which has to be performed after shifting the two arrays one with respect to the other. Simulation results show that the best recognition rate is obtained considering 7 different relative shifts. For instance, if:

$DIN = \{1,3,2,7,5,9,5,8,4,3\}$  $DINj = \{3,4,3,3,2,7,6\}$
$APPX = \{4,4,6,5,3,7,6,6,4,5\}$  $APPXj = \{4,6,7,4,4,5,5\}$
$APPY = \{4,4,6,5,3,7,6,6,6,7\}$  $APPYj = \{2,5,6,3,4,7,6\}$
$Nd = 10$  $Ndj = 7$

The 7 shifts to be considered are:

| | | |
|---|---|---|
| 1. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |
| 2. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |
| 3. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |
| 4. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |
| 5. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |
| 6. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |
| 7. | DIN | {1,3,2,7,5,9,5,8,4,3} |
| | DINj | {3,4,3,3,2,7,6} |
| | APPX | {4,4,6,5,3,7,6,6,4,5} |
| | APPXj | {4,6,7,4,4,5,5} |
| | APPY | {4,4,6,5,3,7,6,6,6,7} |
| | APPYj | {2,5,6,3,4,7,6} |

For each of the 7 mentioned cases the comparison is performed as follows. APPX[i], that is i-th element of the APPX array is compared with APPXj[i] and APPY[i] is compared with APPYj[i]. The comparison is not performed if any of these elements is not available. Then, 3 different cases may occur:

a) APPX[i]=APPXj[i] APPY[i]=APPYj[i]

In this case the comparison result Cijk (k=1, ... 7) is given by the element located in the (DIN[i], DINj[i]) position of the matrix:

(0,0,0,0,0,0,0,0,0,0)
(0,2,1,0,1,0,0,0,0,0)
(0,1,2,1,0,1,0,0,0,0)
(0,0,1,2,0,1,0,0,0,0)
(0,1,0,0,2,1,0,1,0,0)
(0,0,1,0,1,2,1,0,0,1,0)

(0,0,0,1,0,1,2,0,0,0,1)
(0,0,0,0,1,0,0,2,0,1,0)
(0,0,0,0,0,0,0,0,2,0,0)
(0,0,0,0,0,1,0,1,0,2,1)
(0,0,0,0,0,0,1,0,0,1,2)

b) APPX[i]≠APPXj[i] APPY[i]=APPYj[i]

In this case the comparison result Cijk is given by the element located in the (DIN[i], DINj[i]) position of the matrix:

(0,0,0,0,0,0,0,0,0,0)
(0,1,0,0,1,0,0,0,0,0)
(0,0,1,0,0,1,0,0,0,0,0)
(0,0,0,1,0,0,1,0,0,0,0)
(0,1,0,0,1,0,0,1,0,0,0)
(0,0,1,0,0,1,0,0,0,1,0)
(0,0,0,1,0,0,1,0,0,0,1)
(0,0,0,0,1,0,0,1,0,0,0)
(0,0,0,0,0,0,0,0,1,0,0)
(0,0,0,0,0,1,0,0,0,1,0)
(0,0,0,0,0,0,1,0,0,0,1)

c) APPX[i]=APPXj[i] APPY[i]≠APPYj[i]

In this case the comparison result Cijk is given by the element located in the (DIN[i], DINj[i]) position of the matrix:

(0,0,0,0,0,0,0,0,0,0)
(0,1,1,0,0,0,0,0,0,0)
(0,1,1,1,0,0,0,0,0,0)
(0,0,1,1,0,0,0,0,0,0)
(0,0,0,0,1,1,0,0,0,0)
(0,0,0,0,1,1,1,0,0,0,0)
(0,0,0,0,0,1,1,0,0,0,0)
(0,0,0,0,0,0,0,1,0,1,0)
(0,0,0,0,0,0,0,1,0,0,0)
(0,0,0,0,0,0,0,1,0,1,1)
(0,0,0,0,0,0,0,0,0,1,1)

d) APPX[i]≠APPXj[i] APPY[i]≠APPYj[i]

The result of the comparison is Cijk=0.

The overall result of the comparisons related to a given shift position is Cjk=SUM Cijk, where the sum has to be performed over all the i-values for which APPX(i) and APPXj(i) are simultaneously defined.

Finally, the APP/DIN score is given by:

$$Aj = \max(Cjk)*1000/\max(Nd, Ndj)$$
$$k = 1, \ldots 7$$

To evaluate the Rj score, the REL code of the input character and the RELj code of the j-th character in the reference set are compared value-by-value. Let RELi and RELji(i=1, ..., 12) represent the i-th value of REL and the RELj code, the Rj score is given by:

$$Rj = \sum_{i=1}^{12} aij$$

where
aij=2 if RELi=RELij
aij=1 if RELi≠RELj and RELi or RLij is an '='
otherwise aij=0
For instance, if RELi='+=——=+++=' and RELji='++
+=——+=—=',Rj=13.

Once Aj and Rj have been evaluated, they can be inserted to calculate Sdj.

Then, the overall score Sj assigned to the comparison with the j-th character in the reference database is evaluated for each of the Ncar reference characters. The identifier of the reference character with the minimum score is assigned to the unknown input symbol.

The role played by the dynamic weighting factors Wo, Wr, Wp and by the stroke weight SW is very important. In fact, the larger Wo is, the more important is the weight of the optical information in the recognition process. Wr and Wp describe the relative importance of the different components of the dynamical score Sdj. Another important parameter is the stroke weight SW: the larger it is, the larger is the influence of the stroke number. Therefore, depending on the application, it is possible to weight the relative importance of the optical and dynamical part of the algorithm by trimming the Wo, Wr, Wp and SW factors. For example, if the recognition algorithm is used for recognition of Japanese characters, which are generally written with the same stroke sequence, the dynamical contribution becomes very important and the Wo parameter should be smaller than that used for Roman characters. Likewise, SW, Wr and Wp should be larger. For some applications, these weighting factors can be trimmed by the user. Simulation results show that best values for weighting factors are Wo=24, Wr=8, Wp=4, SW=15 for Roman characters and Wo=20, Wr=8, Wp=4, SW=50 for Japanese characters.

The learning process which may be used to educate the computer with respect to the handwriting styles of the user is explained in more detail below. If the user does not wish to educate the system he may rely on recognition being effected by virtue of a reference set either permanently stored on the system or that of another user.

The learning process consists in collecting a suitable number of examples for each symbol the user wants to be recognized. These symbols will form the reference set during the recognition process. Two different learning (or training) modes are available. The first is known as the built-in learning mode. In this mode, the program requests the user to write examples of the symbols listed in a command file. This file contains a complete list of the symbols to be recognized with the corresponding frame constraints. The list of the symbols and the frame constraints can be changed by the user, depending upon the symbols he/she wants to be recognized and his/her handwriting style. Multiple frame constraint values are allowed for each symbol. In order to avoid insertion of bad characters in the learning set the program will reject characters with frame positions different from that stated in the file.

The second mode is the interactive learning mode. The user writes symbols in the order he/she likes. Then recognition is performed. Each time the recogniser fails, unrecognized symbols are automatically inserted in the learning (or reference) set. Also, characters with not allowed frame positions will be rejected.

After the built-in learning mode has been run, the recognition capability can be further improved by adding other characters to the learning set through the interactive learning mode.

This HPCR (hand printed character recognition) project is capable of being implemented on hardware. To ease the migration to silicon, when necessary, the number of black pixels has been chosen constant and equal to 16. However this is merely a prefered choice and is not intended to be limiting.

Migrating the above described system to silicon would provide several advantages, the most relevant being:

an increase in speed which would mean that dedicated hardware could exploit massive parallel architecture to perform the numerous comparison operations needed to implement both the feature extraction and the associative memory in a much shorter time; and the power consumption would be minimized and the dedicated hardware might be activated only when recognition has to be performed. Database memory could be integrated on chip, thus saving the power needed to drive the external buses; and dedicated chips may be employed in low-cost consumer products where powerful, state-of-the-art micro chips are not available.

It has to be mentioned that the system lends itself very well to silicon implementation. In fact, the operations to be performed, though numerous, are very simple in themselves (basically AND and EXNOR). The massively parallel architecture needed for high speed might be built around DRAM memory cores (used for database/feature storage) in a relatively simple way thanks to the internal structure of DRAM themselves.

It should be noted that whilst the system is described with respect to characters forming part of one alphabet or another, recognition of other symbols can also be determined. For example, simple geometrical symbols can be identified by comparing their codes with those of reference geometrical symbols. Some examples of such symbols include semiconductor device symbols (i.e. resistors, capacitors, transistors, diodes, etc), musical symbols (notes, sharps, flats and the like), simple drawings (for example cats, dogs, sun, moon and many, many more). There is no limit to the scope if this system once a reference code has been generated for a given symbol.

We claim:

1. A method for recognizing a script written character from a group of script written characters to be recognized comprising the steps of:

entering the character using character entermeans;

digitizing the character including constructing a matrix of "1's" and "0's" arranged in a plurality of horizontal lines and a plurality of vertical lines intersecting therewith and an array of points representative of the character;

storing the digitized character;

providing a plurality of reference characters having respective codes defined by topological features determined from static optical features of said character and vector features determined from dynamic features of how said character is formed so as to provide a set of reference characters, each reference character of the set corresponding with a specific character of the group of characters to be potentially recognized;

extracting topological features determined from static optical features of said character and vector features determined from dynamic features of how said character is formed of the character to be recognized, the extracting of vector features of the character including extracting a code Nd indicative of the number of points of the character, where Nd+1 is the number of points in a character format STK representative of a stroke format by representing the character as a sequence of strokes, each of the strokes being defined as a series of coordinates between a pen-down and a pen-up condition;

comparing the topological features and the vector features of the character with the topological features and vector features of the plurality of reference characters defining the set of reference characters stored in a memory, each reference character of the set corresponding with a specific character;

performing a logic process to determine which reference character of the set of reference characters has topological features and vector features most closely corresponding to the topological features and the vector features of the digitized character, thereby recognizing the script written character; and wherein extracting vector features of the character further includes providing a code DIN defining the position of each point in the matrix relative to the previous point comprising an array of ND values; and wherein extracting vector features of the character further includes providing a code APPX describing the position of an X-coordinate for each point in the matrix defining the character format STK with respect to at least one predetermined X-coordinate of the character format STK for the character and the position of a Y-coordinate for each point in the matrix defining the character format STK with respect to at least one predetermined Y-coordinate of the character format STK for the character.

2. A method for recognizing a script written character from a group of script written characters to be recognized comprising the steps of:

entering the character using character entermeans;

digitizing the character including constructing a matrix of "1's" and "0's" arranged in a plurality of horizontal lines and a plurality of vertical lines intersecting therewith and an array of points representative of the character;

storing the digitized character;

providing a plurality of reference characters having respective codes defined by topological features and vector features so as to provide a set of reference characters, each reference character of the set corresponding with a specific character of the group of characters to be potentially recognized;

extracting topological features and vector features of the character to be recognized, the extracting of vector features of the character including extracting a code Nd indicative of the number of points of the character, where Nd+1 is the number of points in a character format STK representative of a stroke format by representing the character as a sequence of strokes, each of the strokes being defined as a series of coordinates between a pen-down and a pen-up condition;

comparing the topological features and the vector features of the character with the topological features and vector features of the plurality of reference characters defining the set of reference characters stored in a memory, each reference character of the set corresponding with a specific character;

performing a logic process to determine which reference character of the set of reference characters has topological features and vector features most closely corresponding to the topological features and the vector features of the digitized character, thereby recognizing the script written character;

wherein extracting vector features of the character further includes providing a code DIN defining the position of each point in the matrix relative to the previous point comprising an array of Nd 4-bit values; and wherein extracting vector features of the character further includes providing a code APPX describing the position of an X-coordinate for each point in the matrix defining the character format STK with respect to at least one predetermined X-coordinate of the character format STK for the character and the position of a Y-coordinate for each point in the matrix defining the character format STK with respect to at least one predetermined Y-coordinate of the character format STK for the character.

3. A method as set forth in claim 1, wherein the provision of a code DIN defining the position of each point in the matrix relative to the previous point is described by the code DIN comprising an array of Nd 4-bit values.

4. A method as set forth in claim 1, wherein extracting vector features of the character further includes providing a code REL representing the relative position of the extremal points of the character.

5. A method as set forth in claim 4, wherein performing the logic process to determine which reference character of the set of reference characters has topological features and vector features most closely corresponding to the topological features and vector features of the digitized character comprises:

comparing the topological features and the vector features of the character with the topological features and vector features of the plurality of reference characters defining the set of reference characters stored in a memory with respect to a reference set having the same frame number;

determining a score Sj for each of the reference characters (Ncar) included in the set of reference characters, wherein the score Sj is given by:

$$Sj = Wo*Soj - Sdj$$

where Wo is a weighting factor,

Soj is a topological feature score, and

Sdj is a vector feature score; and identifying the reference character having the lowest score Sj as the script written character.

6. A method as set forth in claim 5, wherein determining the score Sj includes evaluating the topological feature score Soj in accordance with:

$$Soj = SW*|S - Stj| + SUM_{i=1}^{99} |fi - fij| + IW* SUM_{i=1}^{32} |Ni - Nij|$$

where

S= stroke number of the input character,

Stj= stroke number of the j-th reference character, fi= response of the i-th feature to the input character, fij= response of the i-th feature to the j-th reference character, Ni= number of intersections of the i-th line with the input character, Nij= number of intersections of the i-th line with the j-th reference character, SW= stroke weight; and IW= intersection weight.

7. A method as set forth in claim 6, wherein determination of the score Sj includes evaluating the vector feature score Sdj in accordance with:

$$Sdj = Aj + Wr*Rj + Wp*|Nd - Ndj|$$

where Aj is an APP/DIN score obtained by comparing the APPX/APPY and DIN codes,

Rj is the REL score,

Wp and Wr are weighting factors,

Nd is the (number of character points−1) of the input character, and

Ndj is the (number of character points−1) of the j-th reference character.

8. A method as set forth in claim 7, wherein the APP/DIN score is obtained by:

comparing values of the APPX/APPY and DIN codes at a first relative position of the two matrix arrays;

shifting the two matrix arrays with respect to each other to achieve a shifted relative position of the two matrix arrays different from the first relative position of the two matrix arrays;

comparing the APPX/APPY and the DIN values at the shifted relative position of the two matrix arrays; and repeating the sequence of matrix array shifting and comparing the APPX/APPX and DIN values at the new shifted relative position of the two matrix arrays until a multiple number of comparisons of the APPX/APPY and DIN values have been performed.

9. A method as set forth in claim 2, wherein extracting vector features of the character further includes providing a code REL representing the relative position of the extremal points of the character.

10. A method as set forth in claim 9, wherein performing the logic process to determine which reference character of the set of reference characters has topological features and vector features most closely corresponding to the topological features and vector features of the digitized character comprises:

comparing the topological features and the vector features of the character with the topological features and vector features of the plurality of reference characters defining the set of reference characters stored in a memory with respect to a reference set having the same frame number;

determining a score Sj for each of the reference characters (Ncar) included in the set of reference characters, wherein the score Sj is given by:

$$Sj = Wo*Soj - Sdj$$

where

Wo is a weighting factor,

Soj is a topological feature score, and

Sdj is a vector feature score; and identifying the reference character having the lowest score Sj as the script written character.

11. A method as set forth in claim 10, wherein determining the score Sj includes evaluating the topological feature score Soj in accordance with:

$$Soj = SW*|S - Stj| + \mathrm{SUM}_{i=1}^{99} |fi - fij| + IW* \mathrm{SUM}_{i=1}^{32} |Ni - Nij|$$

where

S= stroke number of the input character,

Stj= stroke number of the j-th reference character, fi= response of the i-th feature to the input character, fij= response of the i-th feature to the j-th reference character, Ni= number of intersections of the i-th line with the input character, Nij= number of intersections of the i-th line with the j-th reference character, SW= stroke weight; and IW= intersection weight.

12. A method as set forth in claim 11, wherein determination of the score Sj includes evaluating the vector feature score Sdj in accordance with:

$$Sdj = Aj + Wr*Rj + Wp*|Nd - Ndj|$$

where Aj is an APP/DIN score obtained by comparing the APPX/APPY and DIN codes,

Rj is the REL score,

Wp and Wr are weighting factors,

Nd is the (number of character points−1) of the input character, and

Ndj is the (number of character points−1) of the jth reference character.

13. A method as set forth in claim 12, wherein the APP/DIN score is obtained by:

comparing values of the APPX/APPY and DIN codes at a first relative position of the two matrix arrays;

shifting the two matrix arrays with respect to each other to achieve a shifted relative position of the two matrix arrays different from the first relative position of the two matrix arrays;

comparing the APPX/APPY and the DIN values at the shifted relative position of the two matrix arrays; and repeating the sequence of matrix array shifting and comparing the APPX/APPX and DIN values at the new shifted relative position of the two matrix arrays until a multiple number of comparisons of the APPX/APPY and DIN values have been performed.

* * * * *